Nov. 16, 1954    J. McMULLEN ET AL    2,694,473
BRAKE CONSTRUCTION
Filed Jan. 5, 1951
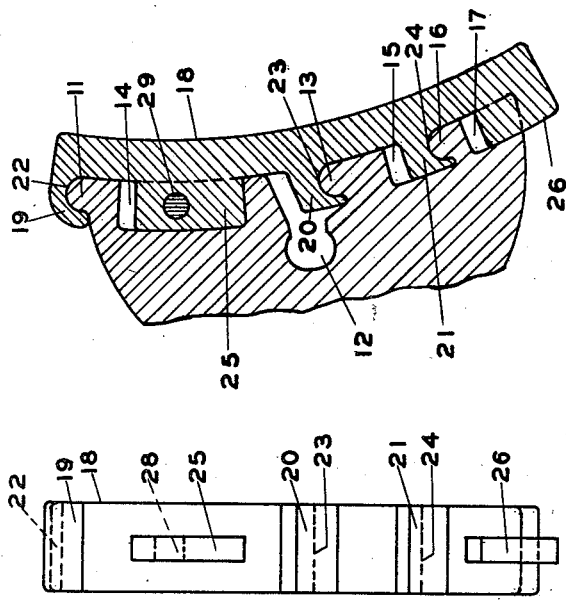
FIG. 5
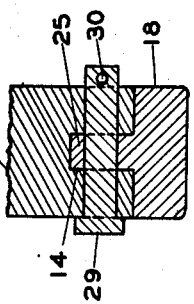
FIG. 6
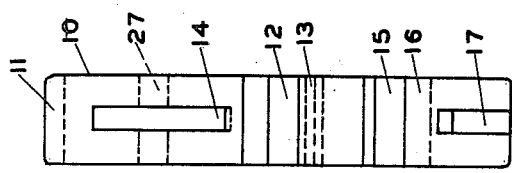
FIG. 4
FIG. 3
FIG. 2
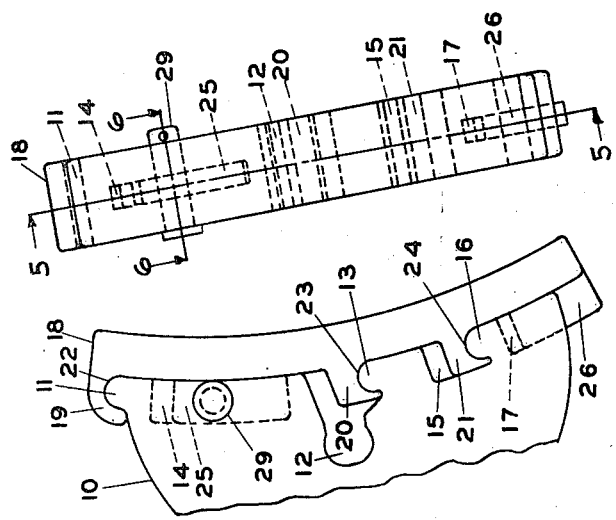
FIG. 1
INVENTORS
JOHN McMULLEN
JOHN F. McMULLEN
VINCENT J. McMULLEN
BY Samuel Reese
ATTY.

United States Patent Office 2,694,473
Patented Nov. 16, 1954

2,694,473

BRAKE CONSTRUCTION

John McMullen, Buffalo, N. Y., and John F. McMullen, Cleveland, and Vincent J. McMullen, Youngstown, Ohio Application January 5, 1951, Serial No. 204,542

6 Claims. (Cl. 188—236)

This invention relates to brake construction particularly for railway cars and is directed primarily to the construction of brake heads and brake shoes.

The brake heads now utilized upon the brake beams of railway cars are a recurring and astounding source of expense to the railroads running into millions of dollars each year. This expense lies not only in the cost of new brake heads but also in the labor involved in replacement of the worn brake heads. To this tangible expense, moreover, must be added the equally important if intangible losses resulting from delays in shipment and from loss of revenue which occurs when cars are bad ordered.

While the cause of this expense has long been known no successful remedy for it has, insofar as we are aware, been heretofore found. The hardness number of brake heads on the Brinell scale is about 130 while the hardness number of the brake shoes which they carry is about 300. This difference in hardness between the brake heads and brake shoes causes the bearing surface of the brake heads to wear rapidly necessitating constant replacement of the brake heads and the losses mentioned above.

Such wear is greatly aggravated, furthermore, by the manner in which the brake shoes are secured to the brake heads. This securement is obtained by means of a key which extends longitudinally and passes through openings in the bearing surfaces of the brake head and brake shoe. These openings are substantial and consequently decrease the amount of bearing surface materially.

It is, accordingly, an object of this invention to provide brake heads and shoes so constructed as to substantially increase the life of the brake heads.

A further object is to provide brake heads and shoes so constructed as to substantially decrease the wear of the brake heads.

A further object is to provide brake heads and shoes so constructed as to substantially increase the bearing area between the brake heads and brake shoes.

A further object is to provide brake heads and shoes so constructed and associated as to maintain intact the bearing surfaces between them.

A further object is to provide brake heads and shoes so constructed and associated as to eliminate movement between them in all directions.

A further object is to provide novel brake heads.

A further object is to provide novel brake shoes.

A further object is to eliminate the great expense now borne by the railroads of replacing worn brake heads, obviate the delays in shipment occasioned thereby and avoid the loss of revenue resulting from such delays.

Other objects of the invention will become clear as the description thereof proceeds.

In the drawing forming part of this specification:

Fig. 1 is a side elevation of a brake head and a brake shoe embodying the instant invention in their assembled relationship.

Fig. 2 is a front elevation of the structure shown in Fig. 1.

Fig. 3 is a front elevation of the brake head.

Fig. 4 is a rear elevation of the brake shoe.

Fig. 5 is a vertical section taken on line 5—5 of Fig. 2.

Fig. 6 is a horizontal section taken on line 6—6 of Fig. 2.

Referring to the drawing wherein a preferred embodiment of our invention is illustrated the reference numeral 10 designates the portion of a brake head in which our invention is embodied. The construction of the brake head which is not illustrated is well known in the art. According to our invention the brake head 10 is provided with an upper transverse bearing portion 11 which preferably is curved as illustrated and for the purposes later described. Below the upper bearing portion 11 the brake head is provided with a transversely extending recess 12 and contiguous to the recess with a transversely extending bearing portion 13 similar to the bearing portion 11. Between the bearing portions 11 and 13 the brake head is formed with a longitudinally extending recess 14 which terminates short of the bearing portions 11 and 13. Below the latter bearing portion the brake head is provided with a transverse recess 15 and a bearing portion 16 similar to the first two bearing portions. Below the bearing portion 16 and spaced therefrom the brake head is provided with a longitudinal recess 17 which extends to the lower edge of the brake head.

Associated with the hereinabove described brake head is a brake shoe 18 which is supported by and secured to the brake head. The brake shoe 18 is formed with similar longitudinally spaced ribs 19, 20 and 21. The underside of these ribs are curved as indicated at 22, 23 and 24 similar in contour to the bearing portions 11, 13 and 16 upon which the ribs are seated. By reason of the contours of the bearing portions and the underside of the ribs a greater bearing surface is provided and the ribs are interlocked with the bearing portions.

With particular reference to Figs. 3 and 4 of the drawings it will be seen that the bearing portions and the ribs of the brake head and brake shoe respectively extend intact from side to side of the brake head and brake shoe.

Between the transverse ribs 19 and 20 the brake shoe is formed with a longitudinally extending rib 25, which is received within the longitudinal recess 14 of the brake head and which is somewhat shorter than said recess. A longitudinally extending rib 26 is also formed on the brake shoe 18 and is received in part within the longitudinally extending recess 17 of the brake head 10. As shown in Figs. 2, 3, 4 and 6 of the drawings the longitudinal recesses 14 and 17 of the brake head and the longitudinal ribs 25 and 26 of the brake shoe are disposed intermediate the sides of the brake head and brake shoe respectively. By the illustrated association of the longitudinal ribs and longitudinal recesses lateral displacement of the brake shoe relative to the brake head is prevented.

In order to secure the brake shoe upon the brake head and prevent longitudinal movement of the brake shoe relative to the brake head, an opening 27 is formed in the brake head 10 and an opening 28 is formed in the longitudinal rib 25 of the brake shoe 18. When the brake head and the brake shoe are operatively associated the openings 27 and 28 are in transverse alinement. A locking pin 29 is passed through the alined openings 27 and 28 and secured in position by means of a cotter pin (not shown) or the like adapted to extend through an opening 30 formed in one end of the pin.

It will be apparent from the foregoing description that the amount of bearing area between the brake head and the brake shoe has been increased substantially over the amount of bearing area which is provided in the brake head and the brake shoe combinations now in use. Moreover, the bearing areas between the brake head and brake shoe remain intact and are not reduced by the device utilized to secure the brake shoe upon the brake head as occurs in the brake heads and brake shoes which are now utilized. Accordingly the wear between the brake head and brake shoe of our invention is materially decreased and a resulting increase in the life of the brake head and brake shoe is obtained. The brake shoe is completely engaged upon the brake head so that movement between them in all directions is eliminated.

It will be apparent that numerous changes and modifications in the details of the invention will be clear to those skilled in the art. It is intended, therefore, that all such modifications and changes be comprehended within this invention which is to be limited only by the scope of the claims appended hereto.

We claim:

1. In combination, a brake head, a brake shoe carried by said brake head, said brake head having longitudinally spaced transverse recesses extending continuously from side to side thereof, transverse bearing surfaces at the upper edge of said brake head and contiguous to the lower portion of each of said recesses, said bearing surfaces extending intact and continuously from side to side of said brake head, said brake shoe having longitudinally spaced transverse ribs projecting therefrom and extending continuously and intact from side to side thereof, the height of said transverse ribs being less than the height of said transverse recesses, the underside of said ribs conforming to said transverse bearing surfaces of said brake head, said ribs being engaged with and supported upon said bearing surfaces by moving said brake shoe laterally relative to said brake head to insert said ribs into said recesses and then moving said brake shoe downwardly relative to said brake head, and means extending transversely through said brake head and brake shoe for fastening said brake head and brake shoe together.

2. The combination as defined in claim 1 in which said brake head has a longitudinal recess intermediate the sides thereof which extends between and terminates short of said upper bearing surface and the bearing surface adjacent thereto and a longitudinal recess intermediate the sides thereof which extends between the lower edge of said brake head and the bearing surface adjacent thereto and terminates short of said latter surface, said brake shoe has a longitudinal rib intermediate the sides thereof which extends between and terminates short of the top rib and the rib adjacent thereto and a longitudinal rib intermediate the sides thereof which extends between the lower edge thereof and the rib adjacent to said lower edge and terminates short of the latter rib, said longitudinal ribs projecting into said longitudinal recesses, and said fastening means extends transversely through one of said longitudinal ribs.

3. The combination as defined in claim 2 in which said longitudinal ribs are shorter than said longitudinal recesses.

4. The combination as defined in claim 1 in which said bearing surfaces and said underside of said ribs are curved and interlocked so as to increase the bearing area therebetween and prevent lateral disengagement thereof.

5. As an article of manufacture a brake head having a plurality of longitudinally spaced transverse bearing surfaces for a brake shoe extending intact and continuously from side to side thereof, longitudinally spaced transverse recesses extending continuously from side to side of said brake head contiguous to certain of said bearing surfaces, a longitudinal recess extending between and terminating short of the upper of said bearing surfaces and the bearing surface below and adjacent thereto, and a longitudinal recess extending between the lower edge of said brake head and the bearing surface above and adjacent to said lower edge and terminating short of said latter bearing surface, said longitudinal recesses lying between the sides of said brake head.

6. As an article of manufacture a brake shoe having a plurality of longitudinally spaced transverse ribs with bearing surfaces projecting from said brake shoe and said surfaces extending intact and continuously from side to side thereof, a longitudinal rib projecting from said brake shoe between and terminating short of the upper of said transverse ribs and the transverse rib below and adjacent thereto, and a longitudinal rib projecting therefrom between the lower edge thereof and the transverse rib above and adjacent to said lower edge and terminating short of said latter rib, said longitudinal ribs lying between the sides of said brake shoe.

References Cited in the file of this patent

UNITED STATES PATENTS

| Number | Name | Date |
|---|---|---|
| 94,960 | Hotchkiss | Sept. 21, 1869 |
| 224,456 | McAlister | Feb. 10, 1880 |
| 846,755 | Newbaker | Mar. 12, 1907 |
| 1,027,581 | Armbrust | May 28, 1912 |
| 1,430,355 | Busse et al. | Sept. 26, 1922 |
| 1,461,254 | Royster | July 10, 1923 |

FOREIGN PATENTS

| Number | Country | Date |
|---|---|---|
| 17,984 | Great Britain | Aug. 10, 1906 |
| 419,921 | Great Britain | Nov. 21, 1934 |